United States Patent [19]

Bonicel et al.

[11] Patent Number: 5,028,116

[45] Date of Patent: Jul. 2, 1991

[54] OPTICAL FIBER CABLE CAPABLE OF WITHSTANDING A JUMP IN TEMPERATURE TO 350° C. FOR A SHORT PERIOD OF TIME

[75] Inventors: Jean-Pierre Bonicel, Lyons; Olivier Tatat, Genas, both of France

[73] Assignee: Les Cables de Lyon, Cedex, France

[21] Appl. No.: 548,537

[22] Filed: Jul. 5, 1990

[30] Foreign Application Priority Data

Jul. 5, 1989 [FR] France .................. 89 09041

[51] Int. Cl.[5] .............................................. G02B 6/44
[52] U.S. Cl. .................................................. 350/96.23
[58] Field of Search ........................... 350/96.23, 96.34

[56] References Cited

U.S. PATENT DOCUMENTS

| | | | |
|---|---|---|---|
| 4,705,571 | 10/1987 | Lange et al. | 186/287.1 |
| 4,723,832 | 2/1988 | Okazato et al. | 350/96.23 |

FOREIGN PATENT DOCUMENTS

| | | |
|---|---|---|
| 0284340 | 9/1988 | European Pat. Off. . |
| 3739879 | 6/1989 | Fed. Rep. of Germany . |
| WO84/00819 | 3/1984 | PCT Int'l Appl. . |
| 1286460 | 8/1972 | United Kingdom . |

OTHER PUBLICATIONS

JP-A-1 114 813 (Fujikura), Patent Abstracts of Japan, vol. 13, No. 355, (P-914)[3703], Aug. 9, 1989.
Patent Abstracts of Japan, vol. 6, No. 221, (P-153)[1099], Nov. 5, 1982; & JP-A-57 124 315, (Kansai Denriyoku K.K.), 08/03/82.

*Primary Examiner*—Akm Ullah
*Assistant Examiner*—Robert E. Wise
*Attorney, Agent, or Firm*—Sughrue, Mion, Zinn, Macpeak & Seas

[57] ABSTRACT

An optical fiber cable capable of withstanding a jump in temperature to 350° C. for a short period of time, the cable comprising:

(a) at least one carrier element of a composite of glass fiber and thermosetting resin;
(b) an optical fiber support constituted by a grooved rod surrounding the carrier element, or a tube preferably provided with carrier elements in its thickness, or by compact structure fibers, the rod or tube being made of a thermoplastic polymer;
(c) optical fibers disposed in the grooves of the rod or inside the tube;
(d) a viscous material filling the grooves or the tube around the optical fibers;
(e) an envelope constituted by a tape of thermoplastic polymer;

wherein the grooved rod or the tube, or the secondary coating of compact structure fibers, is made of crosslinked polyethylene, wherein the viscous material filling the grooves is a silicon resin, and wherein the thermoplastic polymer of the envelope is a polyimide resin. Suitable for use as a guard cable in conjunction with high tension or medium tension electric cables.

3 Claims, 1 Drawing Sheet

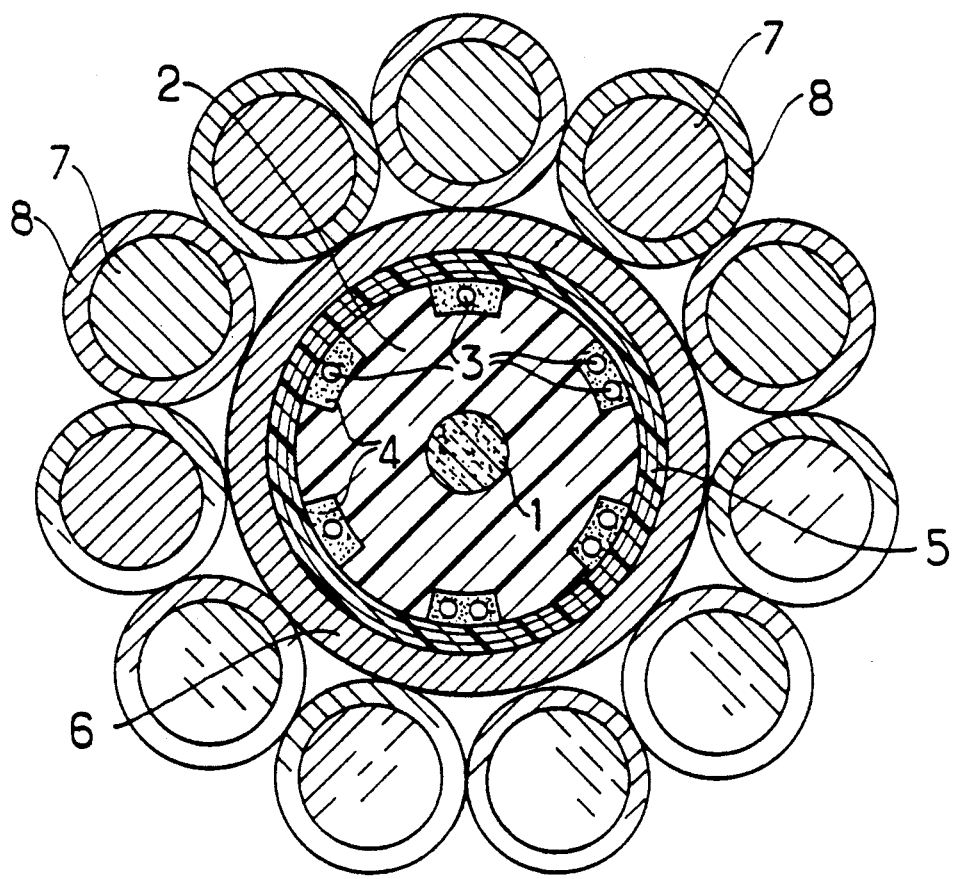

OPTICAL FIBER CABLE CAPABLE OF WITHSTANDING A JUMP IN TEMPERATURE TO 350° C. FOR A SHORT PERIOD OF TIME

BACKGROUND OF THE INVENTION

The present invention relates to an optical fiber cable capable of withstanding a jump in temperature to 350° C. for a short period of time, the cable comprising: (a) at least one carrier element of a composite of glass fiber and thermosetting resin; (b) an optical fiber support constituted by a grooved rod surrounding the carrier element, or a tube preferably provided with carrier elements in its thickness, or by compact structure fibers, the rod or tube being made of a thermoplastic polymer; (c) optical fibers disposed in the grooves of the rod or inside the tube; (d) a viscous material filling the grooves or the tube around the optical fibers; (e) an envelope constituted by a tape of thermoplastic polymer. Such cables are required, in particular as guard cables for high or medium tension electric cables which are subjected to high fault currents due to strokes of lightning or to short circuits. It has been observed that these fault currents may raise the temperature of optical cable fibers disposed in the vicinity to 300° C. or 350° C. for several seconds or several tens of seconds.

To this end, proposals have already been made for compact structure optical fiber cables based on silicone resins. However, such cables cannot withstand large amounts of elongation.

Proposals have also been made for cables including a core constituted by a grooved aluminum or light alloy rod together with optical fibers that are covered by means of a fluorine-containing resin. However, manufacturing a light alloy or aluminum rod requires special tooling which is more expensive than the usual tooling.

The object of the present invention is to provide an optical fiber cable capable of withstanding jumps in temperature to 300° C. to 350° C., which lends itself, in addition, to large amounts of elongation, but which is manufactured using a method and apparatus analogous to those used for ordinary optical fiber cables.

SUMMARY OF THE INVENTION

In the optical fiber cable of the invention the grooved rod or the tube, or the secondary coating of compact structure fibers is made of cross-linked polyethylene, the viscous material filling the grooves is a silicone resin, and the thermoplastic polymer of the envelope is a polyimide resin.

When the optical fiber support is a tube, the polyethylene is preferably cross-linked by adding a silane and by moisture treatment.

Advantageously, the polyimide resin envelope is surrounded by a tube of welded aluminum, and then by armoring.

BRIEF DESCRIPTION OF THE DRAWING

An embodiment of the invention is described by way of example with reference to the accompanying drawing, in which the sole FIGURE is a cross section through an optical fiber guard cable for an overhead line.

DETAILED DESCRIPTION

The FIGURE shows the cable in section on a plane perpendicular to its axis. The cable comprises an axial carrier element 1 made of a composite of glass fiber and epoxy or polyester resin. Around this carrier element, there is disposed a grooved rod 2 made of polyethylene that is cross-linked by adding additives constituted by silanes, ensuring cross-linking by exposure to moisture during a certain time in accordance with the "Sioplas" method described in patent document GB-A-1 286 460. Optical fibers 3 are disposed in the helical grooves of the rod, the fibers being embedded in a silicone-based viscous material 4 capable of withstanding a temperature of 300° C. to 350° C. The grooved rod is wrapped in polyimide tape 5 which is wound helically thereabout. The polyimide envelope is itself disposed in an aluminum jacket 6 protected by armoring constituted by steel wires 7 coated in aluminum (coating 8).

In testing, the aluminum jacket has been raised to a temperature of 400° C. for a period of 30 seconds by the Joule effect (electrical resistance heating), without damaging the optical core constituted by the grooved rod and the fibers. Comparative tests performed on cables having a grooved rod made of various technical thermoplastic polymers such as a polyamide, polybutylene teraphthalate, the fluorine-containing copolymer of ethylene and tetrafluorol ethylene sold by Dupont du Nemours under the trademark "Tefzel", or the perfluoroalcoxy copolymer sold by Dupont de Nemours under the name "PFA" all gave rise to substantially total deterioration of the optical core.

We claim:

1. An optical fiber cable capable of withstanding a jump in temperature to 350° C. for a short period of time the cable comprising:
    (a) at least one carrier element of a composite of glass fiber and thermosetting resin;
    (b) an optical fiber support made of a thermoplastic polymer;
    (c) optical fibers disposed in fiber-receiving spaces of the support;
    (d) a viscous material filling the space around the optical fibers; and
    (e) an envelope constituted by a tape of thermoplastic polymer;
    wherein the optical fiber support is made of cross-linked polyethylene, wherein the viscous material filling the spaces is a silicone resin, and wherein the thermoplastic polymer of the envelope is a polyimide resin.

2. A cable according to claim 1, in which the optical fiber support is a tube, and wherein the polyethylene is cross-linked by adding a silane and by moisture treatment.

3. A cable according to claim 1, wherein the polyimide resin envelope is surrounded by a tube of welded aluminum, itself surrounded by wire armoring.

* * * * *